United States Patent [19]

Sato et al.

[11] Patent Number: 4,922,675
[45] Date of Patent: May 8, 1990

[54] ABRASIVE TAPE

[75] Inventors: Masami Sato; Masaaki Fujiyama; Takashi Iwasaki; Masami Suzuki; Takashi Yoneyama; Hideaki Kosha, all of Kanagawa, Japan

[73] Assignee: Fuji Photo Film Co., Ltd., Kanagawa, Japan

[21] Appl. No.: 337,778

[22] Filed: Apr. 13, 1989

[30] Foreign Application Priority Data

Apr. 13, 1988 [JP] Japan .................. 63-90951

[51] Int. Cl.$^5$ .............................. B24D 11/00
[52] U.S. Cl. ...................... 51/394; 51/295; 51/298; 51/407; 428/217; 428/331
[58] Field of Search .......... 51/394, 402, 407, 399, 51/401, 295, 298; 428/217, 331

[56] References Cited

U.S. PATENT DOCUMENTS

| 4,275,115 | 6/1981 | Naruse | 428/329 |
| 4,399,189 | 8/1983 | Nakashima et al. | 428/329 X |
| 4,420,408 | 12/1983 | Kajimoto et al. | 428/329 |
| 4,514,483 | 4/1985 | Matsuura et al. | 51/281 X |
| 4,710,424 | 12/1987 | Bandara et al. | 428/331 X |
| 4,762,534 | 8/1988 | Ito et al. | 51/295 X |
| 4,767,644 | 8/1988 | Yamaguchi et al. | 51/295 X |
| 4,773,920 | 9/1988 | Chasman et al. | 51/295 X |
| 4,778,714 | 10/1988 | Woolley et al. | 428/217 |
| 4,789,583 | 12/1988 | Akutsu | 428/331 X |
| 4,797,321 | 1/1989 | Funahashi et al. | 428/331 X |

Primary Examiner—Robert P. Olszewski
Attorney, Agent, or Firm—Sughrue, Mion, Zinn, MacPeak & Seas

[57] ABSTRACT

An abrasive tape comprises a flexible substrate and an abrasive layer which is overlaid on the flexible substrate and which contains abrasive grains and a binder. The abrasive grains comprise first abrasive grains, which have a mean grain diameter within the range of 0.07 μm to 0.40 μm and a Mohs hardness within the range of 5 to 7, and second abrasive grains, which have a mean grain diameter within the range of 0.20 μm to 0.60 μm and a Mohs hardness not lower than 8.5.

8 Claims, 1 Drawing Sheet

ABRASIVE TAPE

BACKGROUND OF THE INVENTION

1. Field of the Invention

This invention relates to an abrasive tape to be used for polishing of a magnetic head or the like. This invention particularly relates to an abrasive tape to be used for finish polishing of a rough-polished surface of a magnetic head or the like.

2. Description of the Prior Art

Video or high-grade audio magnetic heads are made by being polished with abrasive tapes. The abrasive tape comprises a flexible substrate, and an abrasive layer overlaid on the flexible substrate. In order to provide the abrasive layer, an abrasive composition consisting of abrasive grains, a binder, additives and the like is applied onto the flexible substrate and dried.

In general, when the surface of a magnetic head or the like is to be polished with the abrasive tape, two reels are positioned with the magnetic head or the like intervening therebetween, and the abrasive tape is moved in contact with the surface to be polished between two reels. The abrasive tape is flexible and can snugly fit to a curved surface. Therefore, the abrasive tape is more suitable for the polishing of the curved surface of the magnetic head or the like than grinding wheels. Also, the abrasive tape can achieve scratch-free, accurate polishing of the surface to be polished, and is therefore indispensable to finish polishing of a rough-polished surface.

As is well known, polishing processes wherein the abrasive tape is used are carried out for the purposes of shaping the tip of a magnetic head into a desired form, eliminating the chipping of a magnetic head, and polishing the surface of a magnetic head to a smooth finish. In order to achieve the polishing process in good manner, it is required that the polishing performance be increased, thereby to shorten the time required for the polishing, and that the smoothness of the polished surface be increased. In order to increase the polishing performance, an abrasive tape provided with hard, large-sized abrasive grains may be used. However, when the abrasive tape provided with hard, large-sized abrasive grains is used, the smoothness of the polished surface cannot be increased. On the contrary, in order to increase the smoothness of the polished surface, an abrasive tape provided with soft, small-sized abrasive grains may be used. However, the polishing performance of the abrasive tape provided with soft, small-sized abrasive grains is low. Therefore, various attempts have been made to provide an abrasive tape which would satisfy both the two incompatible requirements described above. For example, it has been proposed in Japanese Unexamined Patent Publication No. 54(1979)-97408 to employ two types of abrasive grains as the abrasive grains contained in the abrasive layer of an abrasive tape, thereby to increase both the polishing performance of the abrasive tape and the smoothness of a polished surface.

In recent years, information is recorded at an increasingly higher density on magnetic recording media such as video tapes, and therefore magnetic heads are required to exhibit more excellent characteristics. For example, the shortest recording wavelength was approximately 1 $\mu$m for conventional video tapes, and is as short as 0.8 $\mu$m for the S-VHS system video tapes (such as S-MASTER supplied by Fuji Photo Film Co., Ltd. and 5516XTS supplied by Sumitomo 3M Ltd.). As the recording wavelengths are shortened, it is required to improve the characteristics of the magnetic heads. However, the abrasive tape proposed in, for example, Japanese Unexamined Patent Publication No. 54(1979)-97408 is designed to polish magnetic heads to be used with recording wavelengths of approximately 1 $\mu$m, and is not suitable for the polishing of magnetic heads which are recently required to exhibit more excellent characteristics.

SUMMARY OF THE INVENTION

The primary object of the present invention is to provide an abrasive tape which is suitable for the polishing of magnetic heads to be used for high-density recording with recording wavelengths of approximately 0.8 $\mu$m.

Another object of the present invention is to provide an abrasive tape which has a high polishing performance.

The inventors studied various compositions of abrasive layers of abrasive tapes, and found that the aforesaid objects are accomplished when the grain size and the hardness of abrasive grains contained in an abrasive layer are adjusted to values falling within specific ranges.

Specifically, the present invention provides an abrasive tape comprising a flexible substrate and an abrasive layer which is overlaid on said flexible substrate and which contains abrasive grains and a binder, wherein said abrasive grains comprise first abrasive grains, which have a mean grain diameter within the range of 0.07 $\mu$m to 0.40 $\mu$m and a Mohs hardness within the range of 5 to 7, and second abrasive grains, which have a mean grain diameter within the range of 0.20 $\mu$m to 0.60 $\mu$m and a Mohs hardness not lower than 8.5.

With the abrasive tape in accordance with the present invention, the polishing performance is improved by the second abrasive grains having a high hardness and a large grain size. Also, the smoothness of a polished surface is improved by the first abrasive grains having a low hardness and a small grain size. Moreover, when the abrasive tape comprising two types of the abrasive grains having different grain sizes and different hardnesses in accordance with the present invention is used, rough polishing with the second abrasive grains and fine polishing with the first abrasive grains can be achieved simultaneously. Therefore, the abrasive tape in accordance with the present invention can achieve a smoothing process suitable for magnetic heads, which are to be used for high density recording, without the polishing performance being deteriorated.

The mean grain diameter of the first abrasive grains should preferably be within the range of 0.07 $\mu$m to 0.15 $\mu$m, and should more preferably be within the range of 0.10 $\mu$m to 0.13 $\mu$m. The mean grain diameter of the second abrasive grains should preferably be within the range of 0.20 $\mu$m to 0.49 $\mu$m, and should more preferably be within the range of 0.30 $\mu$m to 0.40 $\mu$m. In order to increase the smoothness of the polished surface, the ratio of a value representing the grain size distribution of the first abrasive grains to a value representing the grain size distribution of the second abrasive grains should preferably be approximately 1:2. For example, in cases where the mean grain diameters of the first abrasive grains and the second abrasive grains are 0.11 $\mu$m and 0.33 $\mu$m, respectively, the value of the standard deviation o which is determined from the grain size distribution on the basis of TEM images should preferably be approximately 0.06 μm for the first abrasive grains and approximately 0.14 μm for the second abrasive grains.

The first abrasive grains may be formed of α-Fe2O3, TiO2, SiO2, SnO2 or the like. The second abrasive grains may be formed of Cr2O3, Al2O3, SiC or the like. The ratio of the weight of the first abrasive grains to the weight of the second abrasive grains should be within the range of 1.0:1 to 16.0:1. Said ratio should preferably be within the range of 3.0:1 to 16.0:1, and should more preferably be within the range of 7.0:1 to 16.0:1. If said ratio is smaller than 1.0:1, deep scratches readily arise on the polished surface. If said ratio is larger than 16.0:1, good polishing performance of the abrasive tape cannot be obtained. Also, the proportion of the total weight of the first abrasive grains and the second abrasive grains to the weight of total solids which are contained in the abrasive layer comprising the abrasive grains and the binder should preferably be within the range of 80% to 95%, and should more preferably be within the range of 90% to 95%. If said proportion is lower than 80%, good polishing performance of the abrasive tape cannot be obtained. If said proportion is higher than 95%, the abrasive grains readily separate from the abrasive layer, and the polished surface is detrimentally scratched by the separated abrasive grains. The surface roughness (Ra) of the abrasive layer should preferably be within the range of 0.046 μm to 0.130 μm.

DESCRIPTION OF THE PREFERRED EMBODIMENTS

The present invention will hereinbelow be described in further detail with reference to the accompanying drawings.

Figure 1:
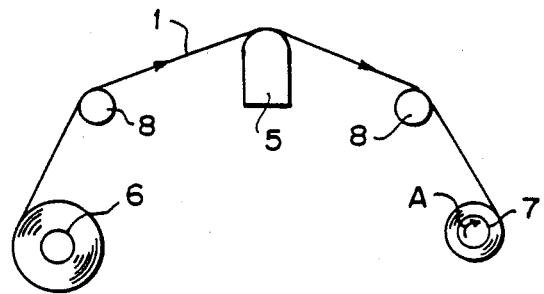
FIG. 1 is a schematic view showing an example of the polishing apparatus wherein the abrasive tape in accordance with the present invention is employed.
Figure 2:
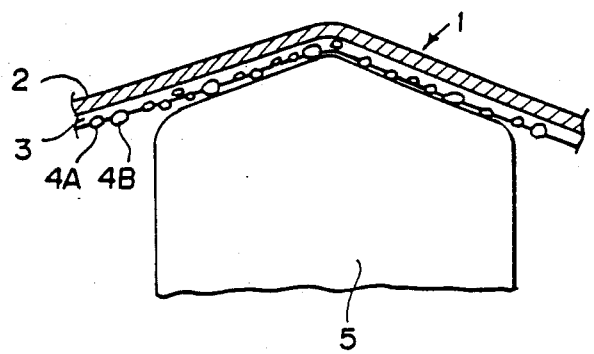
FIG. 2 is an enlarged view showing the abrasive tape and the magnetic head.

With reference to FIG. 1, a tape wind-up reel 7 is rotated in the direction indicated by the arrow A, and an abrasive tape 1 is fed from a tape feed roll 6 in the direction indicated by the arrow. The abrasive tape 1 is threaded over pass rolls 8, 8 so that it is contacted at a predetermined lap angle with a magnetic head 5 which is to be polished. In this manner, the surface of the magnetic head 5 on which the abrasive tape 1 slides is polished by the abrasive tape 1. As shown in FIG. 2, the abrasive tape 1 comprises a flexible non-magnetic substrate 2, which may be constituted of polyethylene terephthalate (PET), polyethylene-2,6-naphthalate or the like, and an abrasive layer 3 overlaid on the flexible non-magnetic substrate 2. The abrasive layer 3 slides on the magnetic head 5 and polishes it. The abrasive layer 3 comprises first abrasive grains 4A having a comparatively low hardness and comparatively small diameters, second abrasive grains 4B having a comparatively high hardness and comparatively large diameters, and a binder or the like, which have been kneaded together and applied onto the flexible non-magnetic substrate 2. The first abrasive grains have a mean grain diameter within the range of 0.07 μm to 0.40 μm and a Mohs hardness within the range of 5 to 7. The second abrasive grains have a mean grain diameter within the range of 0.20 μm to 0.60 μm and a Mohs hardness not lower than 8.5. The binder should have good dispersing quality in order to substantially disperse the first abrasive grains and the second abrasive grains in the abrasive layer 3 and adhere them to the abrasive layer 3. Also, additives such as a lubricant should preferably be added to the abrasive layer 3 so that the abrasive layer 3 exhibits good lubricity with respect to the magnetic head 5 and good movement stability. Preferable thicknesses of the abrasive layer 3 and the flexible non-magnetic substrate 2 vary depending on to what shape the magnetic head 5 is to be polished. In cases where the abrasive tape 1 is to be used for finish polishing of a S-VHS system magnetic head, the thickness of the abrasive layer 3 should preferably be approximately 5 μm when the thickness of the flexible non-magnetic substrate 2 is 30 μm. Also, the thickness of the abrasive layer 3 should preferably be approximately 10 μwhen the thickness of the flexible non-magnetic substrate 2 is 23 μm. If the thickness of the abrasive layer 3 is excessively large, the abrasive tape 1 cannot snugly fit to the magnetic head 5. Therefore, the thickness of the abrasive layer 3 should preferably be not larger than 50 μm.

Figure 3:
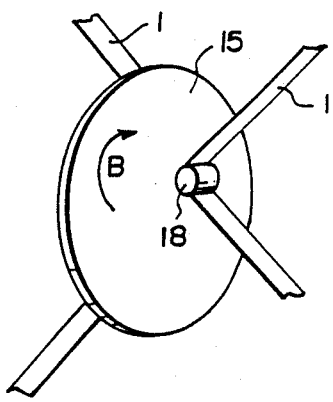
FIG. 3 is a schematic perspective view showing another example of the polishing apparatus wherein the abrasive tape in accordance with the present invention is employed.
Figure 4:
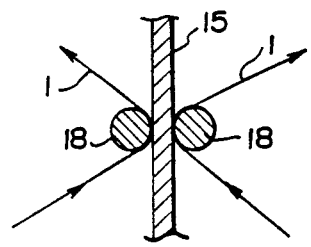
FIG. 4 is a sectional view of the polishing apparatus shown in FIG. 3.

The abrasive tape 1 in accordance with the present invention is suitable particularly for the polishing of a magnetic head having a high performance. However, the abrasive tape 1 in accordance with the present invention may also be used for polishing a hard disk 15 as shown in FIGS. 3 and 4. In cases where the hard disk 15 is to be polished, it is sandwiched between rubber rollers 18, 18, and the abrasive layers of the abrasive tapes 1, 1 are pushed by the rubber rollers 18, 18 against both surfaces of the hard disk 15. The hard disk 15 is then rotated in the direction indicated by the arrow B so that both surfaces of the hard disk 15 are polished simultaneously. In this case, pushing force large than the pushing force exerted to the magnetic head 1 shown in FIGS. 1 and 2 is given to the hard disk 15 which is to be polished. However, since each of the abrasive tapes 1, 1 in accordance with the present invention is provided with two types of the abrasive grains as described above, there is no risk of the hard disk 15 being scratched detrimentally.

The present invention will further be illustrated by the following non-limitative examples.

EXAMPLES

Abrasive tapes were made under different conditions as described below. The term "parts" as used hereinbelow means parts by weight of solids.

TEST EXAMPLE 1

As the first abrasive grains, α-Fe$_2$O$_3$ grains having a mean grain diameter of 0.11 μm and a Mohs hardness of 5.0 were used. Also, Cr$_2$O$_3$ grains having a mean grain diameter of 0.30 μ and a Mohs hardness of 8.5 were used as the second abrasive grains. First, 225 parts of the first abrasive grains and 75 parts of the second abrasive grains were added to a mixture of 8.3 parts of a polyvinyl chloride resin (having a vinyl chloride content of 87% by weight with respect to the total weight of the polyvinyl chloride resin, a number-average molecular weight of $2.6 \times 10^4$, an epoxy group content of 3.5% by weight with respect to the total weight of the polyvinyl chloride resin, and a sodium sulfonate group content of 0.5% by weight with respect to the total weight of the polyvinyl chloride resin), 4.8 parts of a sulfonic acid group-containing polyurethane resin (having a molecular weight of 25,000 per $-SO_3H$ group), 9.6 parts of a polyisocyanate (which was used in the form of an ethyl acetate solution containing a product of reaction of 3 mols of a 2,4-tolylene diisocyanate compound with 1 mol of trimethylolpropane in a concentration of 75% by weight), 0.2 part of KF96-100 (dimethyl polysiloxane having a viscosity of 100 cst), 100 parts of methyl ethyl ketone, and 100 parts of cyclohexanone. The resulting mixture was kneaded substantially in order to obtain a coating composition. The coating composition was applied onto a 23 μm-thick polyester film web so that the thickness of the layer of the applied coating composition was 10 μm. In this manner, an abrasive layer was formed on the polyester film web. After the abrasive layer has been dried, the polyester film web was wound up, and slit into ½ inch widths. In this manner, an abrasive tape was made.

TEST EXAMPLE 2

An abrasive tape was made under the same conditions as Test Example 1, except that $SiO_2$ grains having a Mohs hardness of 7.0 were used as the first abrasive grains.

TEST EXAMPLE 3

An abrasive tape was made under the same conditions as Test Example 1, except that $Al_2O_3$ grains having a Mohs hardness of 9.0 were used as the second abrasive grains.

TEST EXAMPLE 4

An abrasive tape was made under the same conditions as Test Example 1, except that 75 parts of $\beta$-$Fe_2O_3$ grains having a mean grain diameter of 0.11 μm and a Mohs hardness of 5.0 (which grains were of the same type as the first abrasive grains used in Test Example 1) were used as the second abrasive grains.

TEST EXAMPLE 5

An abrasive tape was made under the same conditions as Test Example 1, except that 225 parts of $Cr_2O_3$ grains having a mean grain diameter of 0.30 μm and a Mohs hardness of 8.5 (which grains were of the same type as the second abrasive grains used in Test Example 1) were used as the first abrasive grains.

TEST EXAMPLE 6

An abrasive tape was made under the same conditions as Test Example 1, except that 225 parts of articular $\alpha$-$Fe_2O_3$ grains having a grain diameter of 0.1 μm, a grain length of 1 μm, and a Mohs hardness of 5.0 were used as the first abrasive grains, and the second abrasive grains had a mean grain diameter of 0.50 μm.

TEST EXAMPLE 7

An abrasive tape was made under the same conditions as Test Example 1, except that 225 parts of acicular $\alpha$-$Fe_2O_3$ grains having a grain diameter of 0.06 μm, a grain length of 0.5 μm, and a Mohs hardness of 5.0 were used as the first abrasive grains, and the second abrasive grains had a mean grain diameter of 0.25 μm.

TEST EXAMPLE 8

An abrasive tape was made under the same conditions as Test Example 1, except that the first abrasive grains had a mean grain diameter of 0.03 μm.

TEST EXAMPLE 9

An abrasive tape was made under the same conditions as Test Example 1, except that the first abrasive grains had a mean grain diameter of 0.07 μm.

TEST EXAMPLE 10

An abrasive tape was made under the same conditions as Test Example 1, except that the first abrasive grains had a mean grain diameter of 0.40 μm.

TEST EXAMPLE 11

An abrasive tape was made under the same conditions as Test Example 1, except that the first abrasive grains had a mean grain diameter of 0.80 μm.

TEST EXAMPLE 12

An abrasive tape was made under the same conditions as Test Example 1, except that the second abrasive grains had a mean grain diameter of 0.08 μm.

TEST EXAMPLE 13

An abrasive tape was made under the same conditions as Test Example 1, except that the second abrasive grains had a mean grain diameter of 0.20 μm.

TEST EXAMPLE 14

An abrasive tape was made under the same conditions as Test Example 1, except that the second abrasive grains had a mean grain diameter of 0.60 μm.

TEST EXAMPLE 15

An abrasive tape was made under the same conditions as Test Example 1, except that the second abrasive grains had a mean grain diameter of 0.80 μm.

TEST EXAMPLE 16

An abrasive tape was made under the same conditions as Test Example 1, except that the amounts of the first abrasive grains and the second abrasive grains were changed so that the ratio of the weight of the first abrasive grains to the weight of the second abrasive grains was 0.5:1 while the total weight of the first abrasive grains and the second abrasive grains was kept unchanged.

TEST EXAMPLE 17

An abrasive tape was made under the same conditions as Test Example 1, except that the amounts of the first abrasive grains and the second abrasive grains were changed so that the ratio of the weight of the first abrasive grains to the weight of the second abrasive grains was 1.0:1 while the total weight of the first abrasive grains and the second abrasive grains was kept unchanged.

TEST EXAMPLE 18

An abrasive tape was made under the same conditions as Test Example 1, except that the amounts of the first abrasive grains and the second abrasive grains were changed so that the ratio of the weight of the first abrasive grains to the weight of the second abrasive grains was 10.0:1 while the total weight of the first abrasive grains and the second abrasive grains was kept unchanged.

TEST EXAMPLE 19

An abrasive tape was made under the same conditions as Test Example 1, except that the amounts of the first abrasive grains and the second abrasive grains were changed so that the ratio of the weight of the first abrasive grains to the weight of the second abrasive grains was 16.0:1 while the total weight of the first abrasive grains and the second abrasive grains was kept unchanged.

TEST EXAMPLE 20

An abrasive tape was made under the same conditions as Test Example 1, except that the amounts of the first abrasive grains and the second abrasive grains were changed so that the ratio of the weight of the first abrasive grains to the weight of the second abrasive grains was 32.0:1 while the total weight of the first abrasive grains and the second abrasive grains was kept unchanged.

TEST EXAMPLE 21

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 50% while the ratio of the weight of the first abrasive grains to the weight of the second abrasive grains was kept unchanged.

TEST EXAMPLE 22

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 70% while the ratio of the weight of the first abrasive grains to the weight of the second abrasive grains was kept unchanged.

TEST EXAMPLE 23

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 80% while the ratio of the weight of the first abrasive grains to the weight of the second abrasive grains was kept unchanged.

TEST EXAMPLE 24

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 90% while the ratio of the weight of the first abrasive grains to the weight of the second abrasive grains was kept unchanged.

TEST EXAMPLE 25

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 95% while the ratio of the weight of the first abrasive grains to the weight of the second abrasive grains was kept unchanged.

TEST EXAMPLE 26

An abrasive tape was made under the same conditions as Test Example 1, except that the amounts of the first abrasive grains and the second abrasive grains were changed so that the total percent by weight of the first abrasive grains and the second abrasive grains, i.e. the value calculated with the formula expressed as total weight of both grains×100/(total weight of both grains+weight of solids in binder), was 97% while the ratio of the weight of the first abrasive grains to the weight of the second abrasive grains was kept unchanged.

Table 1 shown below lists information about the firs abrasive grains and the second abrasive grains and the surface roughness (Ra) of the abrasive layers of the abrasive tapes which were made in Test Examples 1 through 26. Column (A) in Table 1 lists the ratios of the weight of the first abrasive grains to the weight of the second abrasive grains, and Column (B) lists the total percent by weight of the first abrasive grains and the second abrasive grains, i.e. the value calculated with the formula expressed as total weight of first abrasive grains and second abrasive grains×100/(total weight of first abrasive grains and second abrasive grains+weight of solids in binder). The surface roughness (Ra) of each abrasive tape was measured at a cut-off value of 0.8 mm, a stylus radius of 2 μm and a stylus speed of 3 mm/sec.

TABLE 1

| Item Test No. | First grains Material | First grains Mean dia. | Mohs hardness | Second grains Material | Second grains Mean dia. | Mohs hardness | (A) | (B) | Surface roughness (Ra) of abrasive layer |
|---|---|---|---|---|---|---|---|---|---|
| 1 | α-Fe$_2$O$_3$ | 0.11 (μm) | 5.0 | Cr$_2$O$_3$ | 0.30 (μm) | 8.5 | 3.0 | 93% | 0.062 μm |
| 2 | SiO$_2$ | " | 7.0 | " | " | " | " | " | 0.064 |
| 3 | α-Fe$_2$O$_3$ | " | 5.0 | Al$_2$O$_3$ | " | 9.0 | " | " | 0.066 |
| 4 | " | " | " | — | — | — | — | " | 0.041 |

TABLE 1-continued

| Item Test No. | First grains Material | First grains Mean dia. | Mohs hardness | Second grains Material | Second grains Mean dia. | Mohs hardness | (A) | (B) | Surface roughness (Ra) of abrasive layer |
|---|---|---|---|---|---|---|---|---|---|
| 5 | — | — | — | $Cr_2O_3$ | 0.30 | 8.5 | — | " | 0.089 |
| 6 | Acicular $\alpha$-$Fe_2O_3$ | (0.1 × 1) | 5.0 | " | 0.50 | " | 3.0 | " | 0.115 |
| 7 | " | (0.06 × 0.5) | " | " | 0.25 | " | " | " | 0.105 |
| 8 | $\alpha$-$Fe_2O_3$ | 0.03 | " | " | 0.30 | " | " | " | 0.051 |
| 9 | " | 0.07 | " | " | " | " | " | " | 0.055 |
| 10 | " | 0.40 | " | " | " | " | " | " | 0.123 |
| 11 | " | 0.80 | " | " | " | " | " | " | 0.143 |
| 12 | " | 0.11 | " | " | 0.08 | " | " | " | 0.032 |
| 13 | " | " | " | " | 0.20 | " | " | " | 0.046 |
| 14 | " | " | " | " | 0.60 | " | " | " | 0.122 |
| 15 | " | " | " | " | 0.80 | " | " | " | 0.151 |
| 16 | " | " | " | " | 0.30 | " | 0.5 | " | 0.074 |
| 17 | " | " | " | " | " | " | 1.0 | " | 0.069 |
| 18 | " | " | " | " | " | " | 10.0 | " | 0.063 |
| 19 | " | " | " | " | " | " | 16.0 | " | 0.055 |
| 20 | " | " | " | " | " | " | 32.0 | " | 0.043 |
| 21 | " | " | " | " | " | " | 3.0 | 50 | 0.038 |
| 22 | " | " | " | " | " | " | " | 70 | 0.042 |
| 23 | " | " | " | " | " | " | " | 80 | 0.046 |
| 24 | " | " | " | " | " | " | " | 90 | 0.057 |
| 25 | " | " | " | " | " | " | " | 95 | 0.072 |
| 26 | " | " | " | " | " | " | " | 97 | 0.110 |

Each of the abrasive tapes made by Test Examples 1 through 26 was set in a polishing apparatus, and a ferrite video head (magnetic head) which had been subjected to rough polishing and intermediate polishing and which had a surface roughness (Ra) of 0.38 μm was polished with the abrasive tape. Then, the time required to polish the magnetic head, the surface roughness (Ra) of the polished magnetic head, and the reproduction sensitivity of the polished magnetic head were investigated. Also, for each of the abrasive tapes made by Test Examples 1, and 21 through 26, the number of abrasive grains which separated from the abrasive tape during the polishing process was investigated. Table 2 shows the results of the investigation and the results of overall evaluation of the abrasive tapes. The time required to polish the magnetic head was the time required to polish the ferrite head by 1 μm. In order to determine the surface roughness (Ra) of the polished magnetic head, the magnetic head was subjected to finish polishing for 16 seconds, and then the surface roughness of the gap surface of the polished magnetic head was measured at a cut-off value of 0.8 mm, a stylus radius of 2 μm and a stylus speed of 0.3 mm/sec. The reproduction sensitivity of the magnetic head was measured after the magnetic head had been subjected to finish polishing for 16 seconds. In order to measure the reproduction sensitivity, the output was measured in advance when a 5 MHz signal was recorded and reproduced by use of a standard magnetic head and a standard magnetic head, and the value of the measured output was taken as 0 dB. Thereafter, the output measured when the 5 MHz signal was reproduced with the video head which had been polished with each abrasive tape was represented as a value relative to the aforesaid output measured with the standard magnetic head and the standard magnetic head. In order to determine the number of abrasive grains separated from the abrasive tape during the polishing process, the surface of the abrasive tape after being used for the finish polishing of the magnetic head was observed by use of an electron microscope (magnification: 5,000), and the number of abrasive grains separated from the abrasive tape was counted in terms of the number of dimples indicating the separation of the abrasive grains. The count was expressed as a relative value.

As for the results of overall evaluation, the "o" mark indicates that both the productivity and the polishing quality were good, the "Δ" mark indicates that the productivity and the polishing quality were not so good, but were practically allowable, and the "x" mark indicates that the productivity and/or the polishing quality was bad. Specifically, in order to evaluate the productivity, the time required to polish the magnetic head was investigated. The productivity was rated to be "o" when the time required to polish the magnetic head fell within the range of 15 to 30 seconds, rated to be "Δ" when the time required to polish the magnetic head fell within the range of 31 to 55 seconds, and rated to be "x" when the time required to polish the magnetic head was longer than 55 seconds. In order to evaluate the polishing quality, the reproduction sensitivity was investigated. The polishing quality was rated to be "o" when the reproduction sensitivity was not lower than +0.5 dB, rated to be "Δ" when the reproduction sensitivity fell within the range of +0.4 to 0 dB, and rated to be "x" when the reproduction sensitivity was lower than 0 dB. The results of the overall evaluation were represented by "x" when the productivity and/or the polishing quality was rated to be "x", represented by "Δ" when the productivity and/or the polishing quality was rated to be "Δ", and represented by "o" when both the productivity and the polishing quality were rated to be "o".

TABLE 2

| Item Test No. | Polishing time | Surface roughness (Ra) of magnetic head | Reproduction sensitivity | Number of separated grains | Overall evaluation |
|---|---|---|---|---|---|
| 1 | 24 sec. | 16 nm | +3.0 db | 3 | |
| 2 | 22 | 18 | +2.8 | — | |
| 3 | 21 | 19 | +2.8 | — | |
| 4 | 150 | 8 | +3.3 | — | X |
| 5 | 11 | 110 | −1.3 | — | X |
| 6 | 8 | 95 | −0.7 | — | X |

TABLE 2-continued

| Item Test No. | Polishing time | Surface roughness (Ra) of magnetic head | Reproduction sensitivity | Number of separated grains | Overall evaluation |
| --- | --- | --- | --- | --- | --- |
| 7 | 12 | 73 | −0.2 | — | X |
| 8 | 70 | 9 | +3.2 | — | X |
| 9 | 40 | 9 | +3.1 | — | Δ |
| 10 | 18 | 45 | +1.2 | — | |
| 11 | 12 | 98 | −0.9 | — | X |
| 12 | 159 | 8 | +3.1 | — | X |
| 13 | 48 | 12 | +3.1 | — | Δ |
| 14 | 15 | 55 | +0.8 | — | |
| 15 | 7 | 132 | −2.0 | — | X |
| 16 | 14 | 96 | −0.7 | — | X |
| 17 | 19 | 51 | +0.7 | — | |
| 18 | 36 | 13 | +3.1 | — | Δ |
| 19 | 55 | 8 | +3.1 | — | Δ |
| 20 | 108 | 7 | +3.2 | — | X |
| 21 | 93 | 12 | +3.2 | 1 | X |
| 22 | 66 | 13 | +3.2 | 1 | X |
| 23 | 48 | 14 | +3.1 | 2 | Δ |
| 24 | 30 | 15 | +3.1 | 3 | |
| 25 | 21 | 23 | +2.6 | 4 | |
| 26 | 19 | 57 | +0.8 | 26 | |

As will be clear from Tables 1 and 2, with the abrasive tapes made by Test Examples 1, 2 and 3 wherein both the first abrasive grains and the second abrasive grains had the mean grain diameter and the Mohs hardness falling within the ranges defined in accordance with the present invention, the time required to polish the magnetic head was short. Also, the surface roughness of the polished surface was low, and consequently the reproduction sensitivity was high. Accordingly, it was revealed that the abrasive tapes made by Test Examples 1, 2 and 3 in accordance with the present invention had good polishing performance and yielded good surface smoothness of the magnetic head. On the other hand, with the abrasive tape made by Test Example 4, which tape was composed of the small-diameter, soft first abrasive grains alone, a very long time was required to polish the magnetic head. The abrasive tape made by Test Example 5, which tape was composed of the large-diameter, hard second abrasive grains alone, yielded high surface roughness and low reproduction sensitivity.

The abrasive tapes made by Test Examples 6 and 7 contained abrasive grains, which were of the same type as those disclosed in Japanese Unexamined Patent Publication No. 54(1979)-97408, as the first abrasive grains and the second abrasive grains. With these abrasive tapes, because the first abrasive grains were long (1 μm in Test Example 6 and 0.5 μm in Test Example 7) and were acicular, the first abrasive grains could not readily be dispersed in the abrasive layer, and the surface roughness of the polished magnetic head was high. Therefore, these abrasive tapes were unsuitable for the polishing of a high-performance magnetic head.

The results of Test Examples 8 through 15 were then compared with the results of Test Example 1. When the mean grain diameter of the first abrasive grains was shorter than 0.07 μm (Test Example 8) and when the mean grain diameter of the second abrasive grains was shorter than 0.2 μm (Test Example 12), a long time was required to polish the magnetic head, and therefore the productivity was bad. Also, when the mean grain diameter of the first abrasive grains was longer than 0.40 μm (Test Example 11) and when the mean grain diameter of the second abrasive grains was longer than 0.60 μm (Test Example 15), the surface roughness of the polished magnetic head increased, and consequently the reproduction output decreased. Accordingly, it was confirmed that the mean grain diameter of the first abrasive grains should fall within the range of 0.07 μm to 0.40 μm, and the mean grain diameter of the second abrasive grains should fall within the range of 0.20 μm to 0.60 μm.

The results of Test Examples 16 through 20 were then compared with the results of Test Example 1. In these Test Examples, the first abrasive grains were constituted of $\alpha$-$Fe_2O_3$ having a mean grain diameter of 0.11 μm and a Mohs hardness of 5 and the second abrasive grains were constituted of $Cr_2O_3$ having a mean grain diameter of 0.30 μm and a Mohs hardness of 8.5. In such cases, when the ratio of the weight of the first abrasive grains to the weight of the second abrasive grains was smaller than 1.0:1 (Test Example 16), because the amount of $Cr_2O_3$ became large, the surface roughness of the polished magnetic head increased, and the reproduction output decreased. When the ratio of the weight of the first abrasive grains to the weight of the second abrasive grains was larger than 16.0:1 (Test Example 20), because the amount of $\alpha$-$Fe_2O_3$ became large, a longer time was required to polish the magnetic head. Therefore, the ratio of the weight of the first abrasive grains to the weight of the second abrasive grains should preferably fall within the range of 1.0:1 to 16.0:1. The preferable range of said weight ratio varies in accordance with the type of the first abrasive grains and the type of the second abrasive grains. Accordingly, said weight ratio in the abrasive tape in accordance with the present invention is not limited to the aforesaid range.

The results of Test Examples 21 through 26 were then compared with the results of Test Example 1. When the total percent by weight of the first abrasive grains and the second abrasive grains, i.e. the value calculated with the formula expressed as total weight of both grains × 100/(total weight of both grains + weight of solids in binder), was smaller than 70% (Test Example 21), a longer time was required to polish the magnetic head. Also, when the total percent by weight of the first abrasive grains and the second abrasive grains was larger than 95% (Test Example 25), more abrasive grains separated from the abrasive tape so that more detrimental scratches arose on the polished magnetic head. Therefore, the total percent by weight of the first abrasive grains and the second abrasive grains should preferably fall within the range of 70% to 95%. The preferable range of the total percent by weight of the first abrasive grains and the second abrasive grains varies in accordance with the type of the first abrasive grains and the type of the second abrasive grains. Accordingly, the total percent by weight of the first abrasive grains and the second abrasive grains in the abrasive tape in accordance with the present invention is not limited to the aforesaid range.

As is clear from the Test Examples described above, the preferable characteristics of the abrasive tape in accordance with the present invention are related to the surface roughness of the abrasive tape. The surface roughness of the abrasive tape in accordance with the present invention should preferably fall within the range of 0.046 μm to 0.130 μm.

In order to investigate preferred compositions for the abrasive tape in accordance with the present invention other than the abrasive grains, abrasive tapes were made as described in Comparative Examples shown below.

COMPARATIVE EXAMPLE 1

An abrasive tape was made in the same manner as Test Example 1, except that an abrasive coating composition obtained by omitting the sulfonic acid group-containing polyurethane resin (4.8 parts) from the abrasive coating composition for the abrasive tape in Test Example 1 was used.

COMPARATIVE EXAMPLE 2

An abrasive tape was made in the same manner as Test Example 1, except that an abrasive coating composition obtained by omitting the polyvinyl chloride resin (8.3 parts) from the abrasive coating composition for the abrasive tape in Test Example 1 was used.

COMPARATIVE EXAMPLE 3

An abrasive tape was made in the same manner as Test Example 1, except that an abrasive coating composition obtained by omitting the polyisocyanate (9.6 parts) from the abrasive coating composition for the abrasive tape in Test Example 1 was used.

Surfaces of ferrite video heads were polished for one minute with the abrasive tapes made by Test Example 1 and Comparative Examples 1, 2 and 3. The polished surfaces of the ferrite video heads were observed by use of a microscope, and scratches having a width of at least 2 μm on each polished surface were counted. Also, each abrasive tape was kept in contact with a magnetic head for three days at 60° C. and 80% RH, and then the presence or absence of corrosion on the surface of the magnetic head was investigated. Table 3 shows the results thus obtained.

TABLE 3

| | Scratches on head surface | | Corrosion of head |
|---|---|---|---|
| | Scratches/0.5 mm | Evaluation | |
| Test Ex. 1 | 0 | o | None |
| Comp. Ex. 1 | 8 | Δ | None |
| Comp. Ex. 2 | 20 | Δ | Corroded |
| Comp. Ex. 3 | 29 | X | None |

As is clear from Table 3, the sulfonic acid group contained in the sulfonic acid group-containing polyurethane contributes to the dispersion of the abrasive grains. As a result, the sulfonic acid group-containing polyurethane uniformly disperses the abrasive grains in the abrasive layer, thereby to make the surface of the abrasive layer smooth, and prevents detrimental scratching of the polished surface. The epoxy group contained in the polyvinyl chloride resin has the effects of prevention of dehydrochlorination, and consequently prevents corrosion of the polished surface caused by dehydrochlorination, particularly corrosion of the polished surface of a readily corrodible material such as Permalloy. Further, the polyisocyanate acts as a curing agent, forms a three-dimensional network in the binder, and therefore prevents separation of the abrasive grains from the abrasive layer. Accordingly, it is possible to prevent the problem that abrasive grains separated from the abrasive layer intervene between the abrasive layer and the polished surface and detrimentally scratch the surface. Accordingly, the aforesaid additives should preferably be added to the abrasive layer of the abrasive tape in accordance with the present invention.

We claim:

1. An abrasive tape comprising a flexible substrate and an abrasive layer which is overlaid on said flexible substrate and which contains abrasive grains and a binder, wherein said abrasive grains comprise first abrasive grains, which have a mean grain diameter within the range of 0.07 μm to 0.40 μm and a Mohs hardness within the range of 5 to 7, and second abrasive grains, which have a mean grain diameter within the range of 0.20 μm to 0.60 μm and a Mohs hardness not lower than 8.5, wherein the ratio of the weight of said first abrasive grains to the weight of said second abrasive grains falls within the range of 1.0:1 to 16.0:1.

2. An abrasive tape as defined in claim 1 wherein the mean grain diameter of said first abrasive grains falls within the range of 0.07 μm to 0.15 μm.

3. An abrasive tape as defined in claim 1 wherein the mean grain diameter of said second abrasive grains falls within the range of 0.20 μm to 0.49 μm.

4. An abrasive tape as defined in claim 1 wherein the ratio of a value representing the grain size distribution of said first abrasive grains to a value representing the grain size distribution of said second abrasive grains is 1:2.

5. An abrasive tape as defined in claim 1 wherein the ratio of the weight of said first abrasive grains to the weight of said second abrasive grains falls within the range of 1.0:1 to 16.0:1.

6. An abrasive tape as defined in claim 1 wherein the proportion of the total weight of said first abrasive grains and said second abrasive grains to the weight of total solids which are contained in said abrasive layer comprising the abrasive grains and the binder falls within the range of 80% to 95%.

7. An abrasive tape as defined in claim 1 wherein the proportion of the total weight of said first abrasive grains and said second abrasive grains to the weight of total solids which are contained in said abrasive layer comprising the abrasive grains and the binder falls within the range of 90% to 95%.

8. An abrasive tape as defined in claim 1 wherein the surface roughness of said abrasive layer falls within the range of 0.046 μm to 0.130 μm.

* * * * *